United States Patent [19]
Gallo et al.

[11] Patent Number: 5,098,937
[45] Date of Patent: Mar. 24, 1992

[54] FLEXIBLE POLYURETHANE FOAMS AND PROCESS FOR PREPARING THEM

[75] Inventors: Bruno Gallo, Mestre, Venezia; Gianflavio Lunardon, Padua, both of Italy

[73] Assignee: Montedipe S.r.l., Milan, Italy

[21] Appl. No.: 524,728

[22] Filed: May 17, 1990

[30] Foreign Application Priority Data

May 17, 1989 [IT] Italy .................. 20542 A/89

[51] Int. Cl.$^5$ .................. C08G 18/14; C08G 18/79
[52] U.S. Cl. ............................. 521/167; 521/99; 521/67; 521/131; 521/163; 521/164
[58] Field of Search ............... 521/159, 160, 163, 172, 521/99, 67, 131, 164, 167

[56] References Cited

U.S. PATENT DOCUMENTS

| | | | |
|---|---|---|---|
| 3,862,879 | 1/1975 | Barron et al. | 161/159 |
| 4,144,386 | 3/1979 | Consoli et al. | 521/167 |
| 4,452,924 | 6/1984 | Radovich et al. | 521/131 |
| 4,546,122 | 10/1985 | Radovich et al. | 521/164 |
| 4,569,952 | 2/1986 | Radovich et al. | 521/167 |
| 4,803,229 | 2/1989 | Narayan et al. | 521/160 |
| 4,910,231 | 3/1990 | Pham et al. | 521/159 |

FOREIGN PATENT DOCUMENTS

| | | |
|---|---|---|
| 022617 | 1/1981 | European Pat. Off. |
| 2711735 | 9/1977 | Fed. Rep. of Germany |
| 2021605 | 5/1979 | United Kingdom |
| 2107336 | 4/1983 | United Kingdom |

OTHER PUBLICATIONS

European Search Report dated Sep. 7, 1990.

*Primary Examiner*—John Kight, III
*Assistant Examiner*—Dvc Truong
*Attorney, Agent, or Firm*—Morgan & Finnegan

[57] ABSTRACT

Flexible polyurethane foams having bulk densities within the range of from 15 to 60 kg/cm$^3$ and a load bearing capacity, under a compression rate of 40%, higher than 50 N, obtained by the reaction of a modified polyisocyanate with a compound containing activated hydrogen atoms in chain-end position, and wherein agents different from chloro-fluoroalkanes are used as the foaming agent.

24 Claims, No Drawings

FLEXIBLE POLYURETHANE FOAMS AND PROCESS FOR PREPARING THEM

FIELD OF THE INVENTION

The present invention relates to flexible polyurethane foams and to the process for preparing them.

More particularly, the present invention relates to flexible polyurethane foams obtained by a process which does not require the use of secondary foaming agents of chloro-fluoro-alkane nature.

BACKGROUND OF THE INVENTION

The technique for producing polyurethane foams has been long known. It consists in reacting polyether-polyols with polyisocyanates in the presence of catalysts, of foaming agents, of cell-regulator surfactants, of stabilizers and of further auxiliary products.

The polyether-polyols presently used to produce flexible polyurethane foams are prepared by condensing one or more alkylene oxides on compounds containing at least two activated hydrogen atoms, such as, e.g., glycols, triols, tetrols, amines and their mixtures.

The more commonly used alkylene oxides are ethylene and propylene oxides, used either alone or as mixtures. For a mixture of propylene and ethylene oxides, the ethylene oxide content of such mixtures should not exceed 45% by weight, in that both the polyol and the resulting polymer would show a too high surface tension. This would prevent the polyurethane from regularly growing in the presence of the silicone surfactants used at present.

The use of polyethers with a high content of ethylene oxide is anyway necessary if one wants to produce flexible, high-softness polyurethane foams.

To overcome these drawbacks, French patent application No. 2,129,823 proposes to improve the processability of the polyol with a high content of ethylene oxide (58–77%) by mixing it with another polyol, with a low content of ethylene oxide (4–15%).

In such a way, the resulting system has a low enough value of surface tension to be suitable for being processed with the customary silicone surfactants.

A disadvantage which affects the process according to the above cited French patent is that the use is required of two polyols which are not mixable with each other, and furthermore that polyols are used which contain a large number of primary hydroxy radicals, which require, in order to yield the end polymer, one single catalyst (i.e., an aminic catalyst).

As a consequence thereof, the suitable balancing between the reactions of polymerization (NCO and OH) and of foaming (NCO and $H_2O$) cannot be obtained; such balancing is normally carried out, in the continuous-block technology of flexible foams, by a pair of catalysts, i.e., a metal-containing catalyst [tin-(II) octanoate, dibutyltin dilaurate, and so forth] and an aminic catalyst (tertiary amines).

In Italian patent 1,858,454 a process is disclosed according to which only one single free polyether-polyol is used. Therefore, such a process does not suffer from the above said drawbacks in the production of flexible polyurethane foams.

In particular, in said Italian patent a process is disclosed for preparing flexible polyurethane foams having an extremely high softness, according to which a polyisocyanate is reacted with a hydroxy-compound in the present of catalysts and of foaming agents and of still further additives, as generally used in the production of polyurethane foams, in which the hydroxy-compound used is a polyether-polyol containing from 75 to 90% by weight of ethylene oxide, and displaying the following characteristics:

(a) a functionality equal to, or higher than, 2, and preferably within the range of from 3 to 4;

(b) an equivalent weight within the range of from 700 to 2200 per each hydroxy radical;

(c) a content of primary hydroxy radicals, relatively to the total hydroxy radicals, within the range of from 2 to 35%; and finally (d) a ratio of the content of ethylene oxide to the primary hydroxy groups within the range of from 2.1 to 42.5;

and the polyisocyanate used is the product from the partial polymerization of toluene-diisocyanate with polyether-polyols, with said polyisocyanate and said hydroxy-compound—to which foaming agents, and so forth, are added—being used in such amounts that the ratio of NCO/OH in the reaction mixture is higher than, or equal to 1, and is preferably within the range of from 1 to 1.15.

Unfortunately, by the process disclosed in Italian patent No. 1,858,454, only polyurethane foams can be obtained whose load-bearing capacity, as measured according to ISO Standard 2439 under a compression rate of 40%, is very low, and typically is lower than 50 N, within the range of bulk densities which is customarily adopted in this application sector (i.e., of from 15 to 60 kg/cm$^3$), in that the formulation taken into consideration, when used in combination with the customarily used foaming agents—prevailingly based on chloro-fluoro-alkanes—do not make possible higher values of load-bearing capacity to be achieved.

DETAILED DESCRIPTION OF THE INVENTION

The present Applicant found now that flexible polyurethane foams displaying higher values of load-bearing capacity then those taught by the prior art, can be obtained when carbon dioxide is used as the only foaming agent.

Therefore, the object of the present invention is flexible polyurethane foams having values of load-bearing power higher than 50 N, when measured according to ISO Standard 2439 under a compression rate of 40%, obtained, in the presence of a foaming agent of a non-chlorofluoroalkane nature, from the reaction between a modified polyisocyanate and a compound containing active hydrogen atoms in chain-end position. The modified polyisocyanate has a content of free NCO radicals within the range of from 10 to 45% by weight, preferably within the range of from 15 to 40% by weight, and is obtained from the partial polymerization of an organic polyisocyanate with an isocyanate functionality of at least 2, with at least one polyether-polyol having a molecular weight within the range of from 1000 to 8000, preferably within the range of from 3000 to 6000, with a hydroxy functionality within the range of from 2 to 4. The compound containing activated hydrogen atoms in chain-end position comprises at least one polyether-polyol obtained by the condensation of propylene oxide- and ethylene oxide, with a content of ethylene oxide within the range of from 10 to 90% by weight, preferably within the range of from 30 to 74% by weight, and having:

(a) a hydroxy functionality within the range of from 2 to 4;
(b) an equivalent weight within the range of from 700 to 2500 per each hydroxy group in chain-end position; and
(c) a content of primary hydroxy groups in chain-end position, relatively to the total amount of hydroxy groups, within the range of from 0 to 100%, and preferably within the range of from 36 to 100%.

According to the present invention the foaming agent is preferably constituted by carbon dioxide alone and the ratio of the equivalents of modified polyisocyanate to the equivalents of the compound containing activated hydrogen atoms in chain-end position is within the range of from 0.8 to 1.2, and is more preferably within the range of from 0.95 to 1.15.

Any organic polyisocyanate capable of yielding polyurethane foams can be used in the practicing of the instant invention, although aromatic diisocyanates, cycloaliphatic diisocyanates nd the corresponding alkyl-substituted derivatives, are preferred.

In particular, low-molecular weight diisocyanates of general formula:

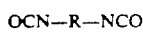  (I)

wherein R represents a possibly alkyl-substituted cycloaliphatic or aromatic radical of from 5 to 25 carbon atoms, such as meta- and/or para-phenylene-diisocyanate, 2,4-toluene-diisocyanate, either alone or in mixture with its 2,6-toluene-diisocyanate isomer, 4,4'-diphenyl-methane-diisocyanate either alone or in mixture with its 2,4'-diphenyl-methane-diisocyanate, 1-isocyanato-3-isocyanato-methyl-3,3,5-trimethylcyclohexane (viz., isophorone-diisocyanate), and so forth, can be used.

The diisocyanate of general formula (I) whose use is preferred is 2,4-toluene-diisocyanate, either alone or in mixture with at least 20% by weight of its 2,6-toluene-diisocyanate isomer.

A nondistilled, or raw toluene-diisocyanate, i.e. a partially purified toluene-diisocyanate drawn from whatever tray of the distillation tower can be commonly used.

As an alternative, medium- or high-molecular-weight polyisocyanates with different degrees of condensations can be used, which are obtained by the reaction of phosgene with aniline-formaldehyde condensates. These products are constituted by mixtures of polymethylene-polyphenyl-polyisocyanates having the general formula:

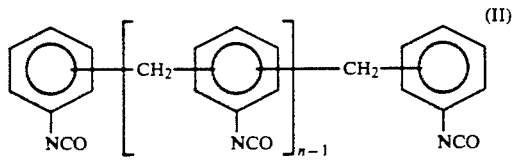  (II)

wherein n is an integer larger than, or equal to 1.

Preferred middle- and high-molecular-weight polyisocyanates are the mixtures of polymethylene-polyphenyl-polyisocyanates having an average functionality of from 2.6 to 2.8. Such products are available from the market under the tradenames "Tedimon 31" by Montedipe, "Suprasec DNR" by I.C.I. and "Desmodur 44 V 20" by Bayer.

The compounds which contain activated hydrogen atoms in chain-end position, to be used in the preparation of the polyurethane foams according to the present invention, are preferably constituted by mixtures of water and polyols obtained from the condensation of mixtures of propylene oxide and ethylene oxide, by so operating as to have in the obtained polyol a total content of ethylene oxide within the range of from 10 to 90% by weight, and preferably contained within the range of from 30 to 74% by weight.

The condensation is carried out on compounds ("starter" compounds) containing at least two activated hydrogen atoms, such as glycols, triols, tetrols and so forth, amines, alkanolamines and polyamines, or mixtures thereof.

The sequence of ethylene oxide and propylene oxide units along the polymer chains of the polyol is not critical for the purposes of the present invention. It can hence be of random type, of block type, or of mixed type.

Representative examples of polyether-polyols to be used according to the present invention in the compound containing activated hydrogen atoms are those capped with propylene oxide or with ethylene oxide and wherein the starter is a glycol, such as dipropyleneglycol, a triol, such as glycerol or trimethylolpropane, a tetrol, such as pentaerythritol, a diamine, such as ethylene-diamine, an alkanolamine, such as triethanolamine, and so forth, or mixture of two or more of the above stated compounds.

In a similar way, the polyether-polyols used in the preparation of the modified polyisocyanate to be used in the preparation of the foams according to the present invention are obtained from the polycondensation of ($C_2$–$C_6$)-alkene oxides on a starter within the above stated range of compounds.

In particular, polyether-polyols can be used, which contain polypropyleneoxide either alone or in mixture with polyethyleneoxide amounts of more than 4% by weight.

Both the polyether-polyols used in the compounds containing activated hydrogen atoms in chain-end position and the polyether-polyols used in the preparation of the modified polyisocyanates can be obtained by processes well-known to those skilled in the art and described, e.g., by Saunders and Frisch in "Polyurethanes, Chemistry and Technology", Interscience, New York (1964).

In the manufacture of the polyurethane foams according to the present invention, the water amount which can be used in the compound containing activated hydrogen atoms in chain-end positions performs a critical task, in that through water the release of carbon dioxide occurs, which causes the process of foaming of polyurethane resin to take place. Water amounts within the range of from 1.5 to 5.5 parts by weight per each 67.5 parts of polyol contained in said compound are the most commonly used amounts.

Therefore, according to the present invention, as the foaming agent for causing the foaming of the polyurethanic resin to take place, carbon dioxide is preferably used, which is developed in situ owing to the chemical reaction between water and the free NCO radicals of modified polyisocyanate. Anyway, this method for feeding the foaming gas to the polymerization mass should not be understood as being a limiting one, in that other gases and other techniques can be used, such as, e.g., the method consisting of bubbling of air, $CO_2$, nitrogen and so forth, through the reaction mass by injecting said gases, under pressure, from the outside, with all of these methods falling always within the scope of the present invention.

The flexible polyurethane foams according to the instant invention can be obtained by a process which comprises the following two steps:

(a) a polyisocyanate of general formula (I) or (II) is reacted with at least one polyether-polyol having a molecular weight within the range of from 1000 to 8000, and preferably within the range of from 3000 to 6000, having a hydroxy functionality within the range of from 2 to 4, such that a modified polyisocyanate is obtained, which contains an amount of free NCI radicals which is within the range of from 10 to 45% by weight, and is preferably within the range of from 15 to 40% by weight;

the so obtained modified polyisocyanate is reacted with a compound containing activated hydrogen atoms in chain-end position, comprising at least one polyether-polyol obtained by the condensation of propylene oxide and ethylene oxide, with a content of ethylene oxide within the range of from 10 to 90% by weight, and preferably within the range of from 30 to 74% by weight, and having:
i) a hydroxy functionality within the range of from 2 to 4;
ii) an equivalent weight within the range of from 700 to 2500 per each hydroxy radical in chain-end positions; and
iii) a content of chain-end primary hydroxy radicals, relative to the total content of hydroxy radicals, within the range of from 0 to 100%, and preferably within the range of from 36 to 100% and wherein agents different from chloro-fluoro-alkanes are used as the foaming agents.

The reactions of said (a) and (b) steps are generally carried out at room temperature and in the presence of aminic catalysts, such as triethylene-diamine, and/or of metal-containing catalysts, such as stannous octanoate, and of other additives, such as cell regulators, stabilizers against thermal oxidation, pigments, and so forth.

The flexible polyurethane foams according to the present invention have values of bulk density within the range of from 15 to 60 kg/m$^3$ and generally within the range of from 18 to 45 kg/cm$^3$ and a load-bearing capacity higher than 50 N, and generally within the range of from 50 to 150 N, when measured according to ISO Standard 2439 under a compression rate of 40%. Therefore, on the one hand, they are endowed with such characteristics as to meet the requirements of the industrial sectors of furniture, of interior decorations, of car, and so forth. On the other hand, they can be produced without having to resort to such foaming agents as chlorofluorocarbons, which represent environmental risks.

EXAMPLES

The following examples are reported for the purpose of better illustrating the present invention without limiting it in any way.

The amounts of the various components of the formulations are expressed as parts by weight unless different indications are given.

EXAMPLE 1

A modified polyisocyanate having a content of about 27% of free NCO radicals is prepared by reacting 57.3 parts of toluene-diisocyanate, having a ratio of the 2,4-isomer to the 2,6-isomer of 80/20, with 42.7 parts of a three-functional polyether-polyol obtained from the polymerization on glycerol of ethylene oxide (A) and propylene oxide (B) with ratios of (A)/(B) of 20/80.

The polyether has a molecular weight of 6000 and an OH number of 28. An amount of 50.8 parts of so-obtained modified polyisocyanate is reacted with 2.4 parts of water and with 67.5 parts of a trifunctional polyether-polyol obtained as follows:

By random condensation on glycerol of a mixture consisting of 65% of ethylene oxide and 35% of propylene oxide, a polyether-polyol with a hydroxy functionality of 3, a molecular weight of 4000, a hydroxy number of 42 and a content of chain-end primary OH of about 50% is obtained.

The mixture of modified polyisocyanate + polyetherpolyol/water is caused to react according to known techniques in the presence of a catalyst constituted by triethylene-diamine and stannous octanoate, and of a silicone surfactant, is stirred for a very short time and is then used to prepare flexible foamed materials having a bulk density of about 32 g/liter and a value of load-bearing capacity under a compression rate of about 40% according to ISO Standard 2439, of about 60 N.

EXAMPLE 2

A modified polyisocyanate having a content of about 31% of free NCO radicals is prepared by causing 66.6 parts of toluene-diisocyanate to react with 33.4 parts of the same polyol as of Example 1.

59.0 parts of so-obtained modified polyisocyanate is reacted with 3.4 parts of water and 67.5 parts of the same trifunctional polyether-polyol as of Example 1.

Flexible foamed materials are obtained which have a bulk density of about 25 g/liter and a value of load-bearing capacity, under a compression rate of about 40% according to ISO Standard 2439, of about 85 N.

EXAMPLE 3

A modified polyisocyanate having a content of about 35% of free NCO radicals is prepared by causing 75 parts of toluene-diisocyanate to react with 25 parts of the same polyol as of Example 1.

64.9 parts of so-obtained modified polyisocyanate is reacted with 4.4 parts of water and 67.5 parts of the same trifunctional polyether-polyol as of Example 1.

Flexible foamed materials are obtained which have a bulk density of about 20 g/liter and a value of load-bearing capacity, under a compression rate of about 40% according to ISO Standard 2439, of about 100 N.

EXAMPLE 4

A modified polyisocyanate having a content of about 27% of free NCO radicals is prepared by causing 58.2 parts of toluene-diisocyanate to react with 12.5 parts of the same polyether-polyol as of Example 1 and with a further 29.3 parts of another trifunctional polyether-polyol obtained by the polycondensation on glycerol of ethylene oxide (A) and propylene oxide (B) with a ratio of (A)/(B) of 15/85.

This latter polyether has a molecular weight of about 4000 and a hydroxy number of 42.

50.8 parts of so-obtained modified polyisocyanate is reacted with 2.4 parts of water and 67.5 parts of the same trifunctional polyether-polyol as of Example 1, besides the customary additives.

Flexible foamed materials are obtained which have a bulk density of about 33 g/liter and a value of load-bearing capacity, under a compression rate of about 40% according to ISO Standard 2439, of about 120 N.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The references are hereby incorporated by reference.

We claim:

1. Flexible polyurethane foams comprising values of load-bearing capacity greater than 50 N, according ISO Standard 2439 under a compression rate of 40%, and a bulk density within the range of from 15 to 60 kg/m$^3$, obtained, in the presence of a foaming agent of a non-chlorofluoroalkane nature, from the reaction between a modified polyisocyanate and a compound containing activated hydrogen atoms, wherein the modified polyisocyanate has a content of free NCO radicals within the range of from 10 to 45% by weight and is obtained from the partial polymerization of toluene diisocyanate, with at least one polyether-polyol having a molecular weight within the range of from 1000 to 8000, with a hydroxy functionality within the range of from 2 to 4, and wherein the compound containing activated hydrogen atoms comprises at least one polyether-polyol obtained by condensation of propylene oxide and ethylene oxide, with a content of ethylene oxide within the range of from 10 to 90% by weight and having:

(a) a hydroxy functionality within the range of from 2 to 4;
   (b) an equivalent weight within the range of from 700 to 2500 per each hydroxy group in chain-end position; and
   (c) a content of primary hydroxy groups in chain-end position, relative to the total amount of hydroxy groups, within the range of from 0 to 100%.

2. Polyurethane foams according to claim 1, wherein the foaming agent is constituted by carbon dioxide alone.

3. Polyurethane foams according to claim 1, wherein the ratio of equivalents of modified polyisocyanate to the equivalents of the compound containing activated hydrogen atoms in chain-end position is within the range of from 0.8 to 1.2.

4. Polyurethane foams according to claim 1, wherein the toluene diisocyanate is 2,3-toluene-diisocyanate, either alone or in mixture with at least 20% by weight of its 2,6-toluene-diisocyanate isomer.

5. Polyurethane foams according to claim 1, wherein the compound containing activated hydrogen atoms is constituted by mixtures of water and polyols obtained from the condensation of mixtures of propylene oxide and ethylene oxide on compounds ("starter" compounds) containing at least two activated hydrogen atoms.

6. Polyurethane foams according to claim 5, wherein a water amount is used, which is within the range of from 1.5 to 5.5 parts by weight per each 67.5 parts of polyol.

7. Polyurethane foams according to claim 5, wherein the foaming agent is in situ developed carbon dioxide.

8. Polyurethane foams according to claim 1, wherein the polyether-polyols used in the preparation of the modified polyisocyanate are obtained from the polycondensation of (C$_2$–C$_6$)-alkene oxides on compounds containing at least two activated hydrogen atoms.

9. Polyurethane foams according to claim 1, having a load-bearing capacity within the range of from 50 to 150 N.

10. Process for preparing the polyurethane foams according to claim 1, comprising the following steps:

(a) a toluene diisocyanate is reacted with at least one polyether-polyol having a molecular weight within the range of from 1000 to 8000, and a hydroxy functionality within the range of from 2 to 4, such that a modified polyisocyanate is obtained, which contains an amount of free NCO radicals which is within the range of from 10 to 45% by weight; and
    (b) so obtained modified polyisocyanate is reacted with a compound containing activated hydrogen atoms comprising at least one polyether-polyol obtained by the condensation of propylene oxide and ethylene oxide, with a content of ethylene oxide within the range of from 10 to 90% by weight, and having:
        i) a hydroxy functionality within the range of from 2 to 4;
        ii) an equivalent weight within the range of from 700 to 2500 per each hydroxy radical in chain-end positions; and
        iii) a content of chain-end primary hydroxy radicals, relative to the total content of hydroxy radicals, within the range of from 0 to 100%.

and wherein agents different from chloro-fluoro-alkanes are used as the foaming agents.

11. Process according to claim 10, wherein the foaming agent is carbon dioxide, preferably developed in situ.

12. Process according to claim 10, wherein the reactions according to the (a) and (b) steps are carried out at room temperature, and in the presence of aminic and/or metal-containing catalysts, cell regulators, thermo-oxidation stabilizers, pigments.

13. Method of using the polyurethane foams as disclosed, or as obtained according to claim 1 in the industry of furniture, of interior decoration and of transports.

14. The foam according to claim 1, wherein the content of free NCO radicals is within the range of from 15 to 40% by weight.

15. The foam according to claim 1, wherein the polyether-polyol has a molecular wight within the range of from 3000 to 6000.

16. The foam according to claim 1, wherein the content of ethylene oxide is within the range of from 30 to 74% by weight.

17. The foam according to claim 1, wherein the content of primary hydroxy groups is within the range of from 36 to 100%.

18. The foam according to claim 1, wherein the ratio of the equivalents of modified polyisocyanate to the equivalents of the compound containing activated hydrogen atoms is within the range of from 0.95 to 1.15.

19. The process according to claim 10, wherein the polyether-polyol has a molecular weight within the range of from 3000 to 6000.

20. The process according to claim 10, wherein the amount of free NCO radicals is within the range of from 15 to 40% by weight.

21. The process according to claim 10, wherein the content of ethylene oxide is within the range of from 30 to 74% by weight.

22. The process according to claim 10, wherein the content of chain-end primary hydroxy radicals is within the range of 36 to 100%.

23. Modified polyisocyanate comprising a content of free NCO radicals within the range of from 10 to 45% by weight and obtained from the partial polymerization of an organic polyisocyanate with an isocyanate functionality of at least 2, with at least one polyether-polyol having a molecular weight within the range of from 1000 to 8000, with a hydroxy functionality within the range of from 2 to 4.

24. Polyether-polyol obtained by condensation of propylene oxide and ethylene oxide, with a content of ethylene oxide within the range of from 10 to 90% by weight, and comprising:
 (a) a hydroxy functionality within the range of from 2 to 4;
 (b) an equivalent weight within the range of from 700 to 2500 per each hydroxy group in chain-end position; and
 (c) a content of primary hydroxy groups in chain-end position, relative to the total amount of hydroxy groups, within the range of from 0 to 100%.